United States Patent [19]

Inoue

[11] Patent Number: 4,618,870

[45] Date of Patent: Oct. 21, 1986

[54] DEVICE FOR COMPENSATING FOR FLUCTUATION OF INK TRANSFER IN THERMAL TRANSFER TYPE PRINTER

[75] Inventor: Takashi Inoue, Asaka, Japan

[73] Assignee: Ricoh Company, Ltd., Tokyo, Japan

[21] Appl. No.: 741,139

[22] Filed: Jun. 4, 1985

[30] Foreign Application Priority Data

Jun. 7, 1984 [JP] Japan ................................ 59-117260
Jun. 7, 1984 [JP] Japan ................................ 59-117261

[51] Int. Cl.$^4$ ............................................ G01D 15/10

[52] U.S. Cl. ................................ 346/76 PH; 400/120; 400/240.3; 346/106

[58] Field of Search ................ 346/76 PH, 76 R, 106; 400/120, 224.2, 240.3, 240.4; 250/317.1, 318; 219/216 PH; 358/248

[56] References Cited

U.S. PATENT DOCUMENTS

| | | | |
|---|---|---|---|
| 4,399,749 | 8/1983 | Arai | 346/76 PH |
| 4,492,965 | 1/1985 | Ohnishi et al. | 346/76 PH |
| 4,524,368 | 6/1985 | Inui et al. | 346/76 PH |

*Primary Examiner*—A. Evans
*Attorney, Agent, or Firm*—Oblon, Fisher, Spivak, McClelland & Maier

[57] ABSTRACT

A device for compensating fluctuation in the amount of ink transfer in a thermal transfer type printer in which plurality of densities or a plurality of colors of thermally fusible ink are thermally transferred to a printing medium sequentially over a plurality of times so as to reproduce a halftone and/or color image. Transfer signals other than a particular one which is to be transferred are weighted and added to or subtracted from the latter to compensate transfer energy at the time of multi-layer transfer. Fluctuation of the transfer energy due to previously transferred ink is prevented to enhance the quality of image reproduction.

6 Claims, 12 Drawing Figures

DEVICE FOR COMPENSATING FOR FLUCTUATION OF INK TRANSFER IN THERMAL TRANSFER TYPE PRINTER

BACKGROUND OF THE INVENTION

1. Field of the Invention

The present invention relates to a thermal transfer type printer for reproducing halftone images or color images by sequentially transferring thermally fusible ink having a plurality of densities or a plurality of colors one upon another onto a printing medium. More particularly, the present invention relates to a device for compensating for fluctuation in the amount of ink which is transferred by such a printer.

2. Discussion of the Background

In a printer of the type described, a plurality of kinds of thermally fusible ink provided on an ink sheet are sequentially fused by heat generating elements which are supported by a thermal head and, thereby, transferred to a paper one upon another. Assuming that all the different kinds of ink share the same physical properties such as fusing temperature and specific heat, the energy required for fusing, or transferring, ink sequentially increases from the ink to be transferred first toward the ink to be transferred last. Specifically, an image is synthesized on a recording medium in multiple layers by transferring different kinds of ink such that they lie one upon another in dots on the medium and, since the transfer energy applied to one of the different kinds of ink for transferring it in a dot is absorbed by another kind of ink which has been transferred to the dot before, greater energy is required for transferring ink associated with the second layer than ink associated with the first or lowermost layer, for transferring ink associated with the third layer than ink associated with the second layer, and so on.

For example, energy necessary for ink to be transferred to a given dot area on a printing medium varies with the number of layers previously transferred to the paper; the former increases with the latter. In addition, since ordinary images are not always solid and, especially, the dot area in the case of color images is modulated, the occupation ratio of ink in the lowermost layer constantly fluctuates causing complemenary variation in the energy which is necessary for the transfer of ink.

Despite the situation discussed above, it has been customary to apply the same transfer energy to all the kinds of ink to be transferred to a printing medium. This, however, allows the amount of ink transfer to fluctuate because precedingly transferred ink absorbs heat applied to ink which is transferred next, resulting in poor image reproduction quality.

SUMMARY OF THE INVENTION

It is therefore an object of the present invention to provide a device associated with a heat transfer type printer for preventing the amount of ink transfer from being effected by ink which has been transferred to a recording medium before, thereby enhancing the quality of image reproduction.

It is another object of the present invention to provide a generally improved device for compensating for fluctuation of the amount of ink transfer in a thermal transfer type printer.

In a thermal transfer type printer which is supplied with transfer signals each being indicative of a particular transfer order in response to a video signal representative of an image to thermally and sequentially transfer particular kinds of thermally fusible ink which are associated with the orders of transfer one upon another on a printing medium, a device for compensating fluctuation in an amount of transfer of the ink to the printing medium of the present invention comprises a transfer signal input circuit to which a plurality of the transfer signals are supplied, and a transfer signal compensating circuit for outputting one of the transfer signals indicative of a first and a last transfers out of the supplied plurality of transfer signals directly as a transfer signal of the assigned order, while outputting all the other transfer signals as transfer signals of the orders assigned respectively to the other transfer signals after subjecting each of the other transfer signals to compensation which is associated with the order of the transfer signal.

In accordance with the present invention, there is provided a device for compensating fluctuation in the amount of ink transfer in a thermal transfer type printer in which plurality of densities or a plurality of colors of thermally fusible ink are thermally transferred to a printing medium sequentially over a plurality of times so as to reproduce a halftone and/or color image. Transfer signals other than a particular one which is to be transferred are weighted and added to or subtracted from the latter to compensate transfer energy at the time of multi-layer transfer. Fluctuation of the transfer energy due to previously transferred ink is prevented to enhance the quality of image reproduction.

The above and other objects, features and advantages of the present invention will become more apparent from the following detailed description taken with the accompanying drawings.

DESCRIPTION OF THE PREFERRED EMBODIMENTS

While the device for compensating fluctuation of ink transfer in thermal transfer type printer of the present invention is susceptible of numerous physical embodiments, depending upon the environment and requirements of use, substantial numbers of the herein shown and described embodiments have been made, tested and used, and all have performed in an eminently satisfactory manner.

Figure 1:
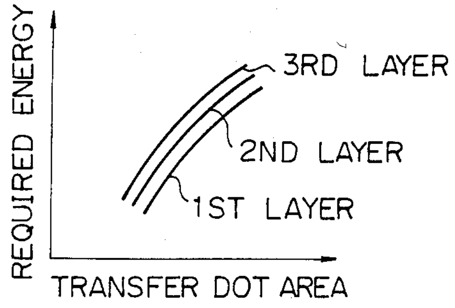
FIGS. 1 and 2 show curves which represent exemplary characteristics of a thermal transfer type printer to which the present invention is applicable.
Figure 2:
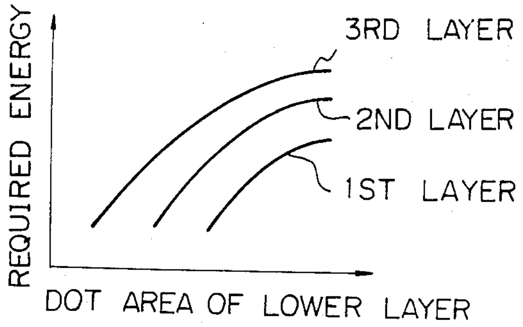

First, as shown in FIG. 1, energy necessary for ink to be transferred to a given dot area on a printing medium varies with the number of layers previously transferred to the paper; the former increases with the latter. In addition, since ordinary images are not always solid and, especially, the dot area in the case of color images is modulated, the occupation ratio of ink in the lowermost layer constantly fluctuates causing complemenary variation in the energy which is necessary for the transfer of ink, as shown in FIG. 2.

Despite the situation discussed above, it has been customary to apply the same transfer energy to all the kinds of ink to be transferred to a printing medium. This, however, allows the amount of ink transfer to fluctuate because precedingly transferred ink absorbs heat applied to ink which is transferred next, resulting in poor image reproduction quality.

The present invention will be described more specifically with reference to the accompanying drawings.

Figure 3:
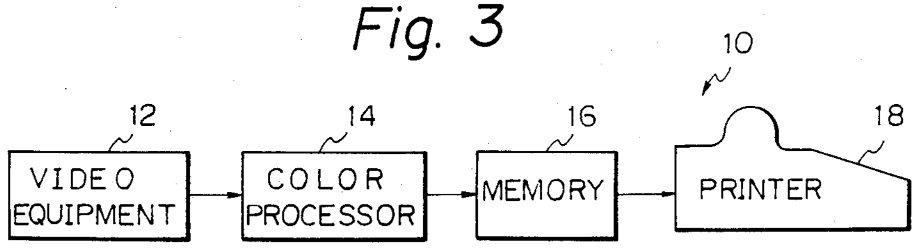
FIG. 3 is a schematic block diagram of an example of color video printers together with a drive control apparatus associated therewith

Referring to FIG. 3, an example of color video printers and a drive control arrangement associated therewith are shown. In the illustrative system, generally 10, an image reader or like video equipment produces color video signals, while a color processor 14 color-processes the incoming color video signals. The processed signals output from the color processor 14 are fed to a store 16 which may comprise a frame memory or a buffer memory. A printer 18 reads the color video signals out of the store 16 and reproduces color images on a printing medium by transferring a plurality of colors of thermally fusible ink one upon another.

Figure 4:
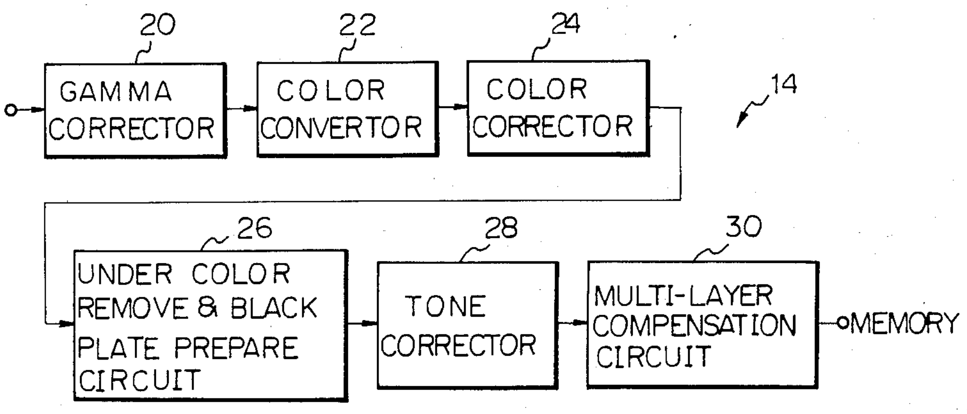
FIG. 4 is a block diagram of a color processor which is included in the drive control apparatus of the color video printer as shown in FIG. 3.

A specific construction of the color processor 14 is shown in FIG. 4. As shown, the color video signal from the video equipment 12 is corrected by a gamma-corrector 20, and then converted from red, blue and green color signals and luminance signal to a plurality of color signals by a color converter 22. The color signals are applied from the color converter 22 to a color corrector 24 to undergo usual color correction. The output of the color corrector 24 is delivered to an under color remove and black plate prepare circuit 26. The output of this circuit 26 is applied to a tone corrector 28 for tone correction and, then, to a multi-layer compensation circuit 30 adapted to compensate energy in the case of layers other than the lowermost. The output of the multi-layer compensation circuit 30 is delivered to the store 16.

Figure 5:
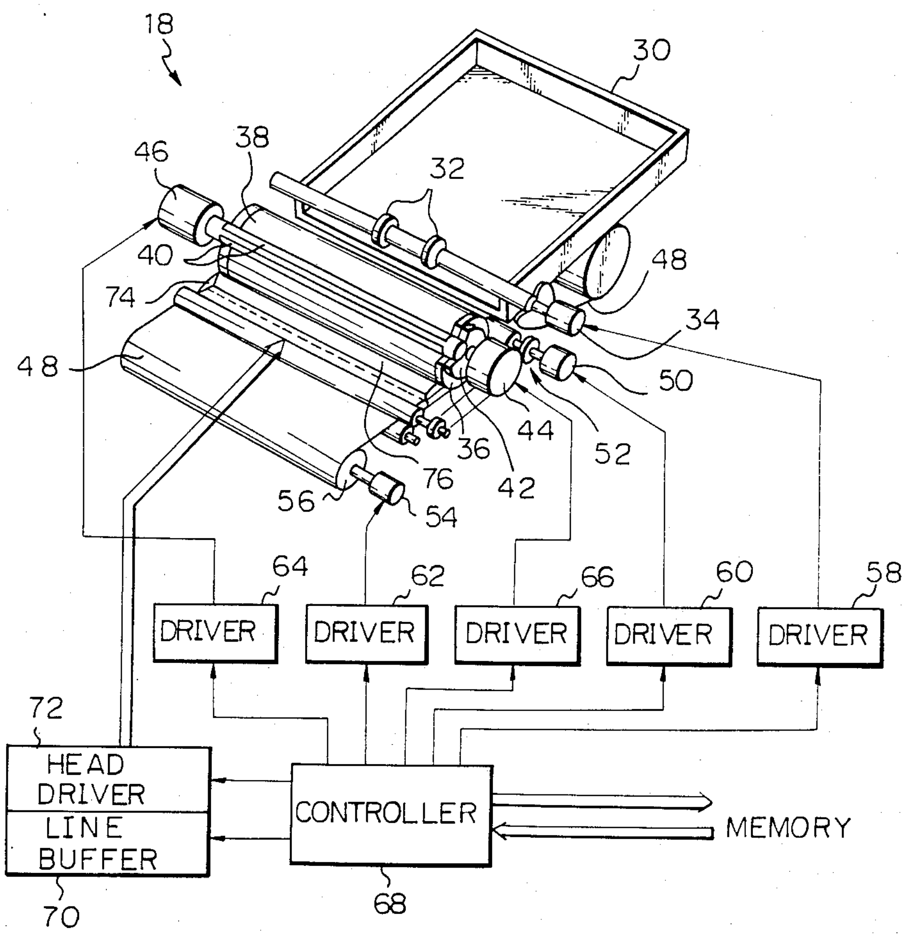
FIG. 5 is a perspective view of an example of the printer shown in FIG. 3.

Referring to FIG. 5, the printer 18 includes a sheet feeder 29 which is provided with rollers 32 and a motor 34. As the rollers 32 are rotated by the motor 34, they feed a sheet 38 toward a platen 36. The sheet 38 is fixed in place around the platen 36 by lock pawls 40. Specifically, the lock pawls 40 serve to lock and unlock the sheet 38 actuated by a cam 42 and a clutch 44. The platen 36 is driven by a motor 46 in a rotational motion. A feed mechanism 52 is driven by a motor 50 to feed an ink sheet 48, while a roller 56 is driven by a motor 54 to take up the ink sheet 48 after the transfer of ink to the paper 38. The motors 34, 50, 54 and 46 and clutch 44 respectively are driven by drivers 58, 60, 62, 64 and 66 which in turn are controlled by a controller 68. The controller 68 sequentially leads color signals line by line out of the memory 16 matched to a particular drawing speed and transfers the one line of color signals to a line buffer 70. A head driver 72, to which the one line of signals are supplied, drives heat generating elements of a thermal head 74 which are arranged in one line. The controller 68 operates in a manner which is well known in the art.

In operation, a sheet 38 fed out of the sheet feeder 29 is retained around the platen 36 by the lock pawls 40 and, then, the ink sheet 48 is fed such that a part thereof which is provided with ink of a particular color is aligned with the thermal head 74. In the thermal head 74, the heat generating elements are driven by the head driver 72 based on a color signal which are read out of the line buffer 70, whereby the ink on the ink sheet 48 is fused and transferred to the sheet 38 on the platen 36. After the transfer of one line of information, both the sheet 38 and the ink sheet 48 are fed by one line in order to transfer the next line of information responsive to a color signal representative of the next line. Such line-by-line transfer is repeated thereafter using the same color. Then, a separator member 76 separates the ink sheet 48 from the sheet 38, while the roller 56 takes up that part of the ink sheet 48 which is not needed any longer. The sequence of events described so far is repeated for each of the other colors to reproduce a complete color picture. For example, thermally fusible yellow, magenta and cyan ink may be sequentially transferred to the sheet 38 responsive to yellow, magenta and cyan color signals.

The present invention contemplates to compensate for the fluctuation of the amount of ink transfer in a thermal transfer type printer by use of the multi-layer compensation circuit 30, which is installed in the color processor 14 of the above-described video printer drive control apparatus. Various embodiments of the multi-layer compensation circuit will be described in detail.

Figure 6:
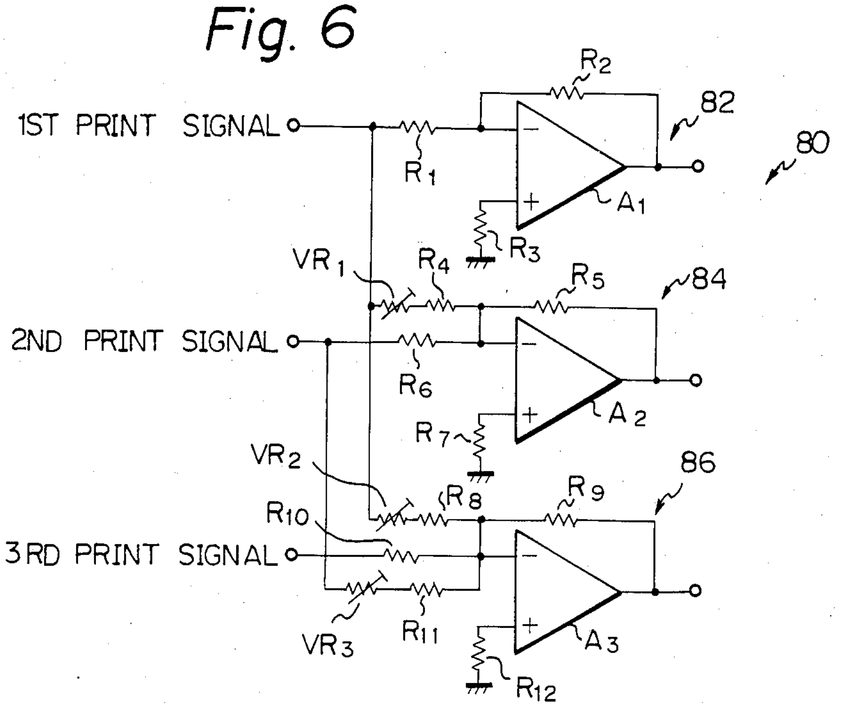

Referring to FIG. 6, a multi-layer compensation circuit 80 in accordance with a first embodiment of the present invention is shown. The circuit 80 comprises an amplifier section 82 and adder sections 84 and 86 which are made up of operational amplifiers (op amps) A1–A3, resistors R1–R12 and variable resistors VR1–VR3. The principle underlying the illustrative embodiment is weighting a signal representative of a plate to be transferred and adding the weighted signal to another plate which is to be transferred next. Specifically, among signals representative of the first to third plates which are applied simultaneously time from the tone corrector 28 to the circuit 80, i.e., signals to be applied sequentially to the thermal head 74 at the the first to third transfers, one representative of the first plate is delivered directly to the store 16 via the amplifier 82. Meanwhile, a weighted version of the signal associated with the first plate is added to the signal representative of the second plate by the adder 84, while weighted versions of the signals associated with the first and second plates are added to the signal representative of the third plate by the adder 86. Therefore, the first to third plate signals which respectively are output from the amplifier 82 and adders 84 and 86 have each undergone compensation against absorption of transfer energy by precedingly transferred ink, the signals being routed to the store 16.

Figure 7:
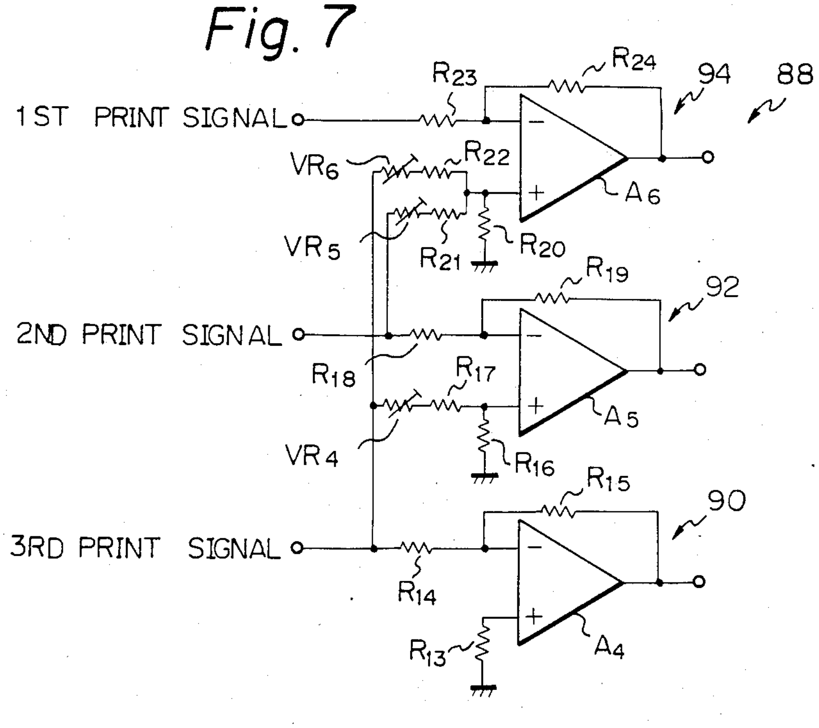

Referring to FIG. 7, a multi-layer compensation circuit 88 in accordance with a second embodiment of the present invention is shown. The circuit 88 comprises an amplifier section 90 and subtractor sections 92 and 94 which are made up of op amps A4–A6, resistors R13–R24 and variable resistors VR4–VR6. Basically, the illustrated compensator arrangement subtracts from a signal representative of a plate to be transferred a weighted version of a signal representative of a plate to be transferred next. In detail, among the signals representative of the first to third plates which are applied simultaneously from the tone corrector 28 to the circuit 88, one representative of the third plate is delivered directly to the store 16 via the amplifier 90. Meanwhile, a weighted version of the third plate signal is subtracted from the signal representative of the second plate by the subtractor 92, and weighted versions of the third and second plate signals are subtracted from the signal representative of the first plate. Again, the plate signals which respectively are output from the amplifier 90 and subtractors 92 and 94 to be delivered to the store 16 have each undergone compensation against fluctuation of transfer energy attributable to previously transferred ink.

Figure 8:
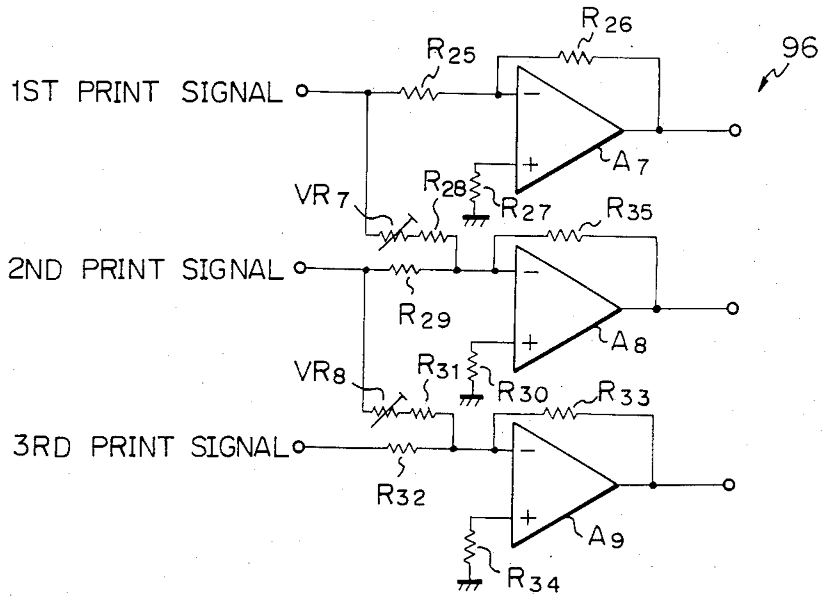
FIGS. 6–12 are circuit diagrams of multi-layer compensation circuits which represent various embodiments of the present invention.

Referring to FIG. 8, a multi-layer compensation circuit 96 in accordance with the third embodiment of the present invention comprises op amps A7–A9, resistors R25–R35 and variable resistors VR7 and VR8. It will be seen from the drawing that signals representative of the first to third plates which are produced simultaneously from the tone corrector 28 are compensated by addition and subtraction of weighted versions of the signals in order to compensate for fluctuation of transfer energy which will be caused by previously transferred ink.

As described above, the first to third embodiments of the present invention compensate transfer energy at the time of multi-layer transfer by addition or subtraction of weighted versions of signals associated with plates other than a particular one which is to be transferred to or from a signal associated with that particular plate. This effectively eliminates fluctuation of transfer energy which stems from precedingly transferred ink, thereby enhancing high quality image reproduction.

Figure 9:
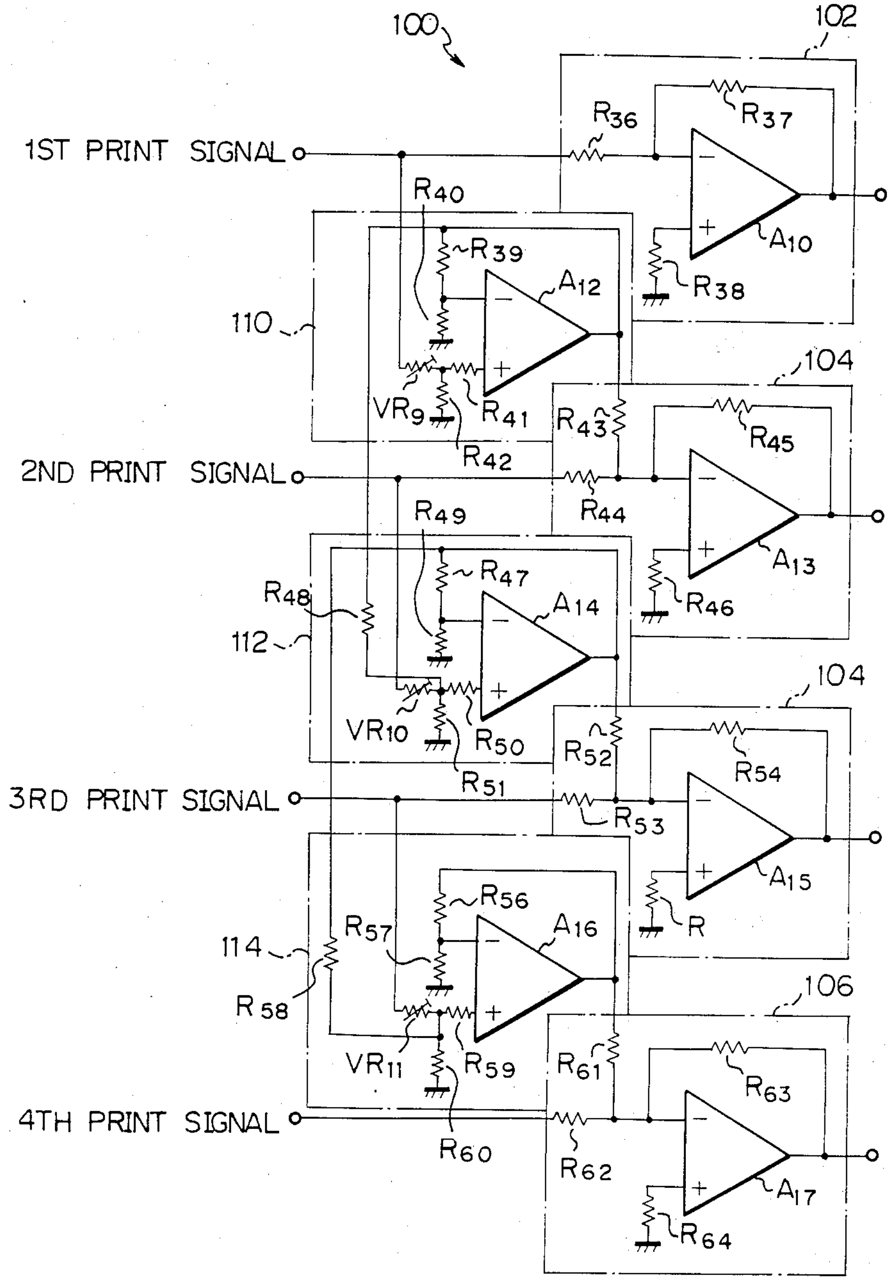

Referring to FIG. 9, a multi-layer compensation circuit 100 in accordance with the fourth embodiment of the present invention comprises an amplifier section 102, adder sections 104, 106 and 108, and integrator sections 110, 112 and 114 which are made up of op amps A10–A17, resistors R36–R64, and variable resistors VR9–VR11. Signals representative of the first to fourth plates which are applied simultaneously from the tone corrector 28, i.e., a color signal to be applied to the thermal head 74 at the first transfer to a color signal to be applied thereto at the fourth transfer, are weighted and added by the integrators 110, 112 and 114 in order of transfer, thereby providing compensation signals. That is, the integrators 110, 112 and 114 are each adaped to generate a signal for compensating for fluctuation in the amount of transfer of ink, which is to be superposed on another, which will be caused by ink previously transferred. At the first transfer, since no ink is transferred yet, the first plate signal is passed through the amplifier 102 to the store 16. After the first transfer effected by the first plate signal, the integrator 110 generates a compensation signal for the second transfer by weighting the first plate signal. The compensation signal is associated with fluctuation (decrease) in the amount of of ink to be transferred at the second transfer which is attributable to the ink transferred first. The compensation signal is added to the signal representative of the second plate by the adder 104. At the third transfer, at which time the first and second transfers have been completed responsive to the first and second plate signals, the integrator 112 weights and adds the first and second plate signals which are applied therto via the integrator 110, thereby providing a compensation signal. This compensation signal is associated with fluctuation in the amount of transfer of ink, which is to be transferred at the third transfer, due to ink which has been transfered by the first and second transfers, the signal being added to the third plate signal by the adder 106. At the fourth transfer, at which time the first to third transfers have been completed responsive to the first to third plate signals, the integrator 114 weights and adds an output of the integrator 112, which is the result of the weighted addition of the first and second plate signals, and the third plate signal, thereby providing a compensation signal. This compenation signal, which is associated with fluctuation in the amount of transfer of ink to be transfered by the fourth transfer, is added to the signal representative of the fourth plate by the adder 108. The first to fourth plate signals produced respectively from the amplifier 102 and adders 104, 106 and 108 have each undergone compensation for absorption of transfer energy by previously transferred ink. As a result, each ink transfer is effected with adequate energy which enhances the quality of color image reproduction.

Figure 10:
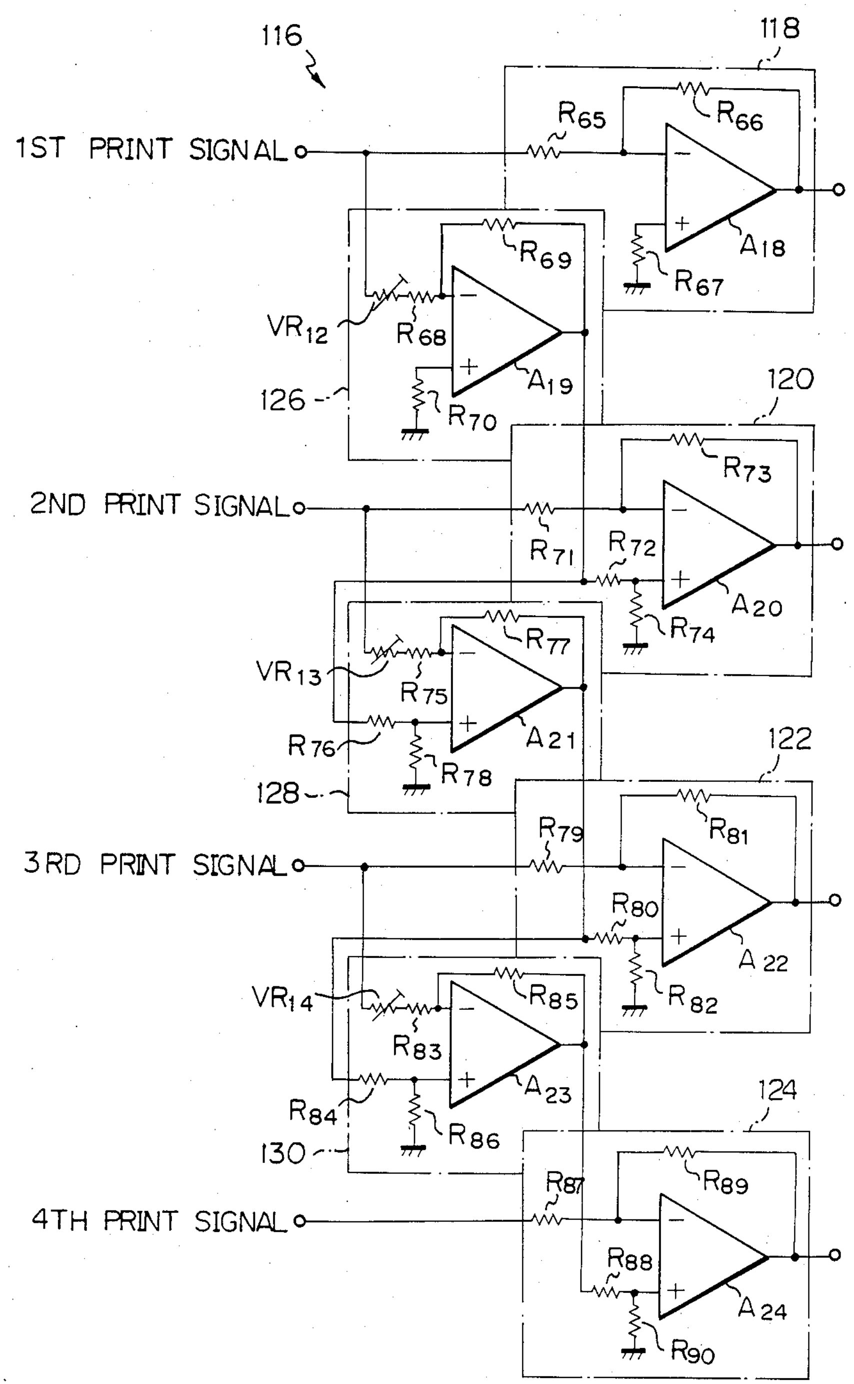

Referring to FIG. 10, a multi-layer compensation circuit 116 in accordance with the fifth embodiment of the present invention comprises an amplifier section 118, subtractor sections 120, 122 and 124, and integrator sections 126, 128 and 130 which are made up of op amps A18–A24, resistors R65–R91, and variable resistors VR12–VR14. The integrators 126, 128 and 130, like the integrators 110, 112 and 114 of the fourth embodiment, provide and then invert compensation signals using signals representative of the first to fourth plates. Specifically, a signal representative of the first plate is delivered directly to the store 16 via the amplifier 118, while signals representative of the second to fourth plates respectively are applied to the subtractors 120, 122 and 124 so that outputs of the integrators 126, 128 and 130 are subtracted therefrom, that is, virturally the compensation signals are added.

Figure 11:
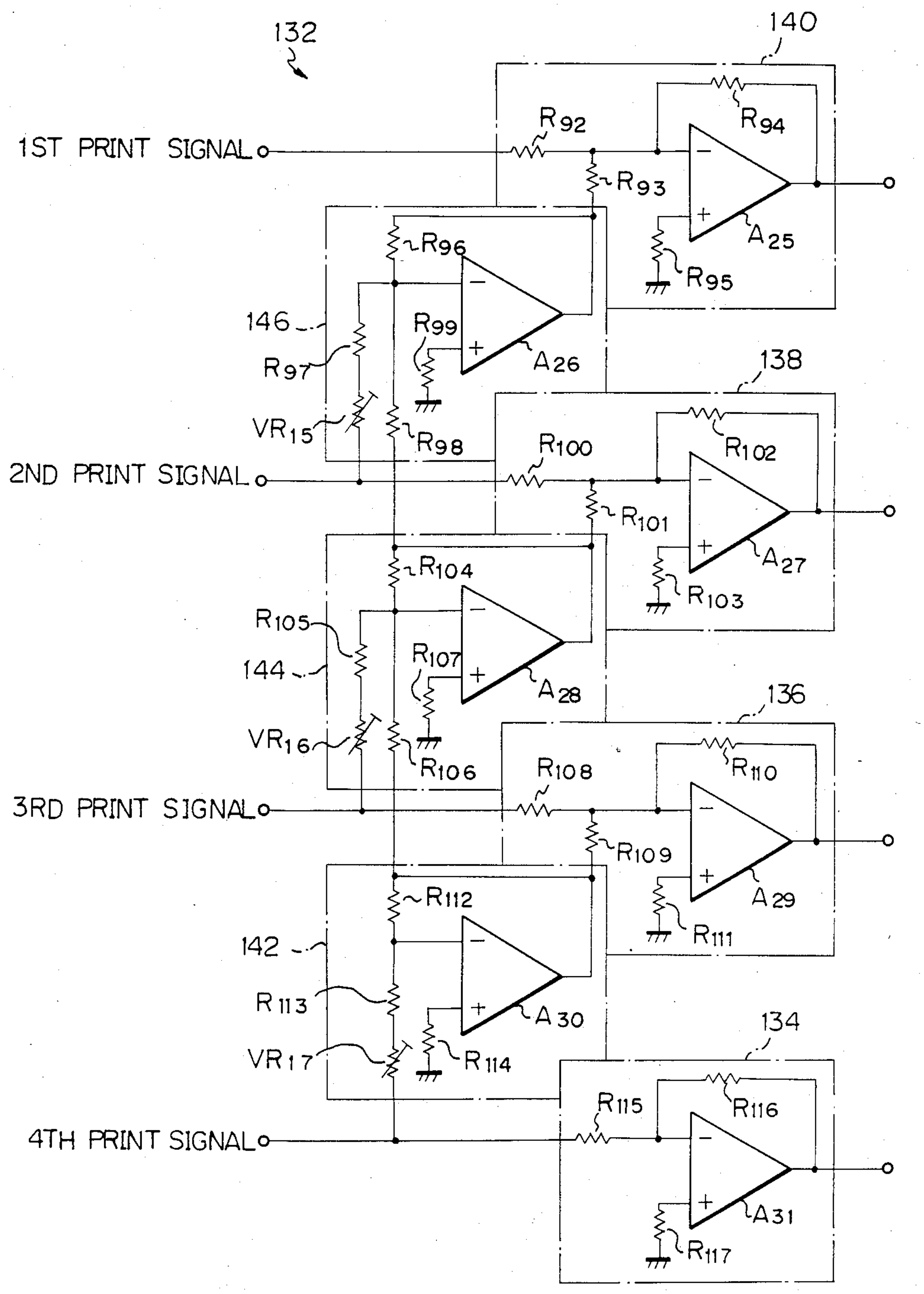

Referring to FIG. 11, a multi-layer compensation circuit 132 in accordance with the sixth embodiment of the present invention comprises an amplifier section 134, adder sections 136, 138 and 140, and integrator sections 142, 144 and 146 which are made up of op amps A25–A31, resistors R92–R117, and variable resistors VR15–VR17. The circuit 132 functions to provide compensation signals by weighting and adding signals associated with the first to fourth plates in order opposite to the transfer order. In detail, the integrators 142, 144 and 146 each provide a compensation signal based on a signal representative of the fourth plate, which is delivered to the store 16 via the amplifier 134. The integrator 142 weights the fourth plate signal to produce a compensation signal and, then, inverts it. The adder 136 adds an output of the integrator 142 to a signal associated with the third plate (the compensation signal being subtracted). The integrator 144 weights an output of the integrator 142 and the third plate signal to produce a compensation signal and then inverts it. The adder 138 adds an output of the integrator 144 to a signal representative of the second plate. Further, the integrator 146 weights an output of the integrator 144 and the second plate signal to provide a compensation signal and then inverts it. The adder 140 adds an output of the integrator 146 to a signal representative of the first plate. The outputs of the amplifier 134 and adders 136, 138 and 140 associated with the respective plates have each been provided with compensation against absorption of transfer energy by previously transferred ink and are fed to the store 16.

Figure 12:
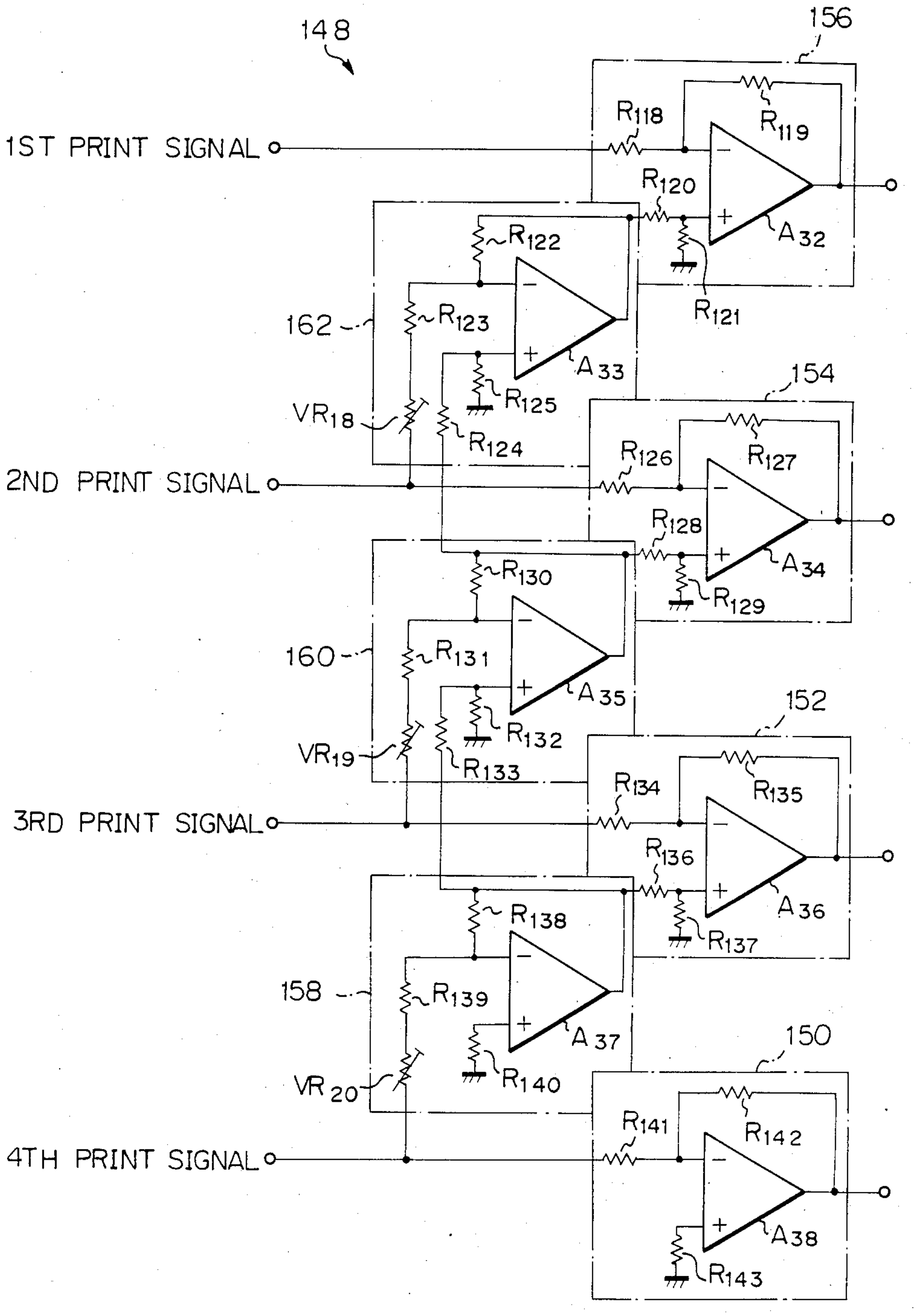

Referring to FIG. 12, a multi-layer compensation circuit 148 in accordance with the seventh embodiment of the present invention comprises an amplifier section 150, subtractor sections 152, 154 and 156, and integrator sections 158, 160 and 162 which are made up of op amps A32–A38, resistors R118–R143, and variable resistors VR18–VR20. A fourth plate signal is routed as it is to the store 16 via the amplifier 150. The integrator 158 weights the fourth plate signal to provide a compensation signal and then inverts it. The subtractor 152 subtracts an output of the integrator 158 from a third plate signal. The integrator 160 subtracts the third plate signal from an output of the integrator 158 to provide a compensation signal and then inverts it. The subtractor 154 subtracts an output of the integrator 160 from a second plate signal. The integrator 162 subtracts the second plate signal from an output of the integrator 160 and inverts the resulting signal, while the subtractor 156 subtracts an output of the integrator 162 from a first plate signal. Again, the signals appearing from the amplifier 150 and subtractors 152, 154 and 156 have each undergone compensation against absorption of transfer energy by previously transferred ink.

As described above, in accordance with the fourth to seventh embodiments of the present invention, signals representative of a plurality of plates are weighted and processed to provide compensation signals so as to compensate the respective plate signals by the compensation signals, thereby compensating transfer energy at each of a plurality of transfers. This eliminates the fluctuation of transfer energy attributable to previously transferred ink and, thereby, promotes high quality reproduction of images.

Various modifications will become possible for those skilled in the art after receiving the teachings of the present disclosure without departing from the scope thereof. For example, while all the compensators 80, 88, 96, 100, 116, 132 and 148 in the illustrative embodiments have been implemented by op amps, they may be constructed as active circuits using transistors or like elements. The printer 18 is not limited to the illustrated drum type and is applicable to any other types insofar as they transfer images by sequentially laying different plate surfaces of an ink sheet one upon another. The number of times of transfer, which is four in the illustrative embodiments, is only illustrative and may be more than or less than four.

Further, while each of the embodiments shown and described is adapted for sequential transfer of a plurality of colors of thermally fusible ink, the present invention is applicable also to a system which sequentially transfers a plurality of densities of thermally fusible ink or a plurality of densities and colors of thermally fusible ink.

What is claimed:

1. A device for compensating fluctuation in the amount of transfer of ink to a printing medium in a thermal transfer type printer which is supplied with transfer signals each of said transfer signals being indicative of a particular assigned transfer order of said signals in response to a video signal representive of an image to thermally and sequentially transfer particular kinds of thermally fusible ink which are each associated with said assigned transfer order one upon another on a printing medium, said device comprising:

transfer signal input means to which a plurality of transfer signals are supplied; and transfer signal compensation means for outputting one of the transfer signals indicative of one of a first and a last transfer directly as a transfer signal of said one of said first and last transfer of said assigned transfer order, while outputting all other of said transfer signals as transfer signals of the orders assigned respectively to said other transfer signals after subjecting each of said other transfer signals to compensation which is representative of said particular assigned order of said transfer signals.

2. A device as claimed in claim 1, wherein said transfer signal compensation means comprises weighting means for weighting each of said other transfer signals by a predetermined amount which is representative of said particular assigned order of said transfer signals.

3. A device as claimed in claim 2, wherein said weighting means comprises adder means for adding to each of the transfer signals all the transfer signals which precede said transfer signal with respect to the order.

4. A device as claimed in claim 2, wherein the weighting means comprises subtractor means for subtracting from each of the transfer signals all the transfer signals which succeed said transfer signal with respect to the order.

5. A device as claimed in claim 1, wherein the ink is in a plurality of colors, the image comprising a color image.

6. A device as claimed in claim 1, wherein the ink is in a plurality of densities, the image comprising a halftone image.

* * * * *